United States Patent [19]

Tsukamoto

[11] Patent Number: 4,932,285

[45] Date of Patent: Jun. 12, 1990

[54] NON-ROTATING HUB IN STEERING WHEEL ASSEMBLY

[75] Inventor: Yasuhiro Tsukamoto, Patchogue, N.Y.

[73] Assignee: Izumi Corporation Industries, Inc., Patchogue, N.Y.

[21] Appl. No.: 434,364

[22] Filed: Nov. 13, 1989

[51] Int. Cl.⁵ .................. F16H 7/08; B62D 1/16; B62D 1/04

[52] U.S. Cl. .................... 74/552; 74/432; 74/498; 474/101

[58] Field of Search ............ 74/552, 484 R, 492 X, 74/498, 495; 280/777, 778, 731, 750; 29/159 B; 200/61.54; 474/101, 140, 111

[56] References Cited

U.S. PATENT DOCUMENTS

| | | |
|---|---|---|
| 4,106,311 | 8/1978 | Euler .............................. 74/492 X |
| 4,598,603 | 7/1986 | Hiramitsu et al. ........... 200/61.54 X |
| 4,607,539 | 8/1986 | Arima et al. ................. 74/484 R X |
| 4,674,352 | 6/1987 | Mizuno et al. ................. 74/552 X |
| 4,729,254 | 3/1988 | Nogami et al. ................. 74/492 X |
| 4,742,727 | 5/1988 | Mizuno et al. ................... 74/484 R |
| 4,753,599 | 6/1988 | Kokubu et al. .................. 200/61.54 |
| 4,768,394 | 9/1988 | Mizuno et al. ................. 74/552 X |
| 4,796,482 | 1/1989 | Hiramitsu et al. .............. 74/552 X |
| 4,808,146 | 2/1989 | Nogami ........................... 74/492 X |

FOREIGN PATENT DOCUMENTS

| | | | |
|---|---|---|---|
| 2625184 | 12/1977 | Fed. Rep. of Germany ........ 74/492 |
| 0020532 | 2/1979 | Japan .................................. 74/492 |
| 977166 | 12/1964 | United Kingdom ................. 74/492 |

Primary Examiner—Vinh T. Luong
Attorney, Agent, or Firm—Stephen E. Feldman

[57] ABSTRACT

An improved apparatus for retaining a pad or hub of a rotatable steering wheel of a motor vehicle in a non-rotating state, relative to the driver of the vehicle, irrespective of the rotation of the steering wheel provides for two retaining collars supporting a pair of rollers for retaining an endless belt. The endless belt is biased by an idler roller using a three point pressure applying flat spring with two of the pressure points located on the retaining collar.

13 Claims, 2 Drawing Sheets

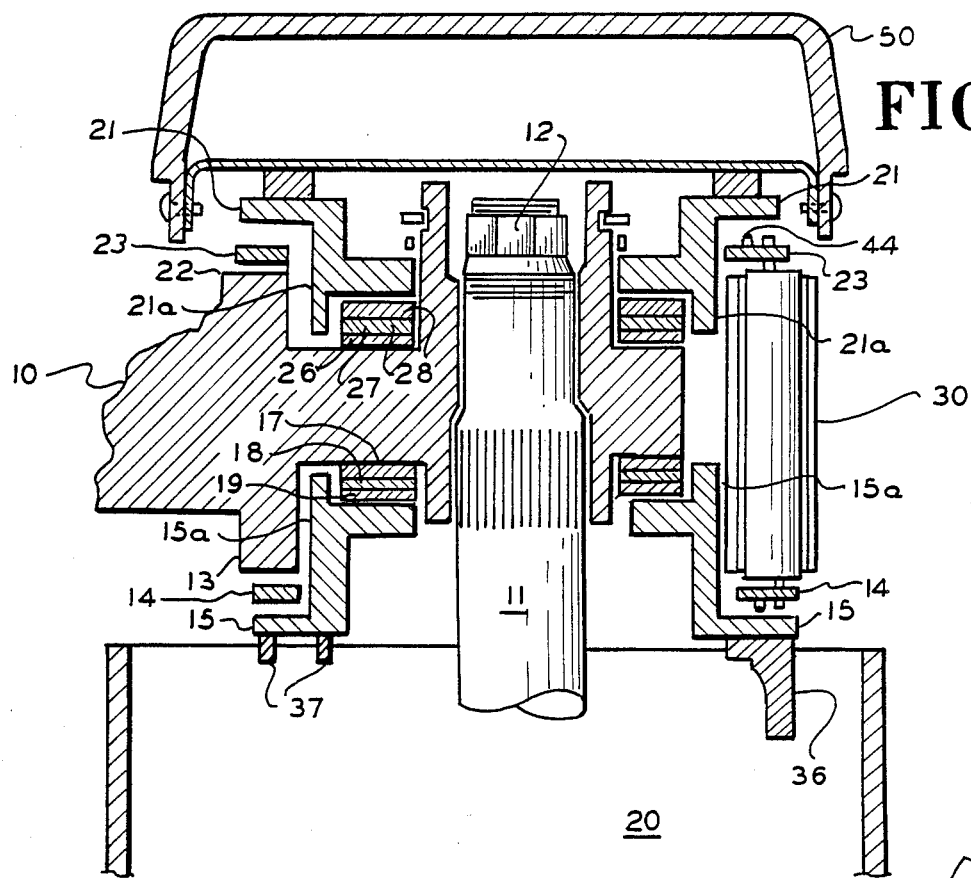
FIG. 2
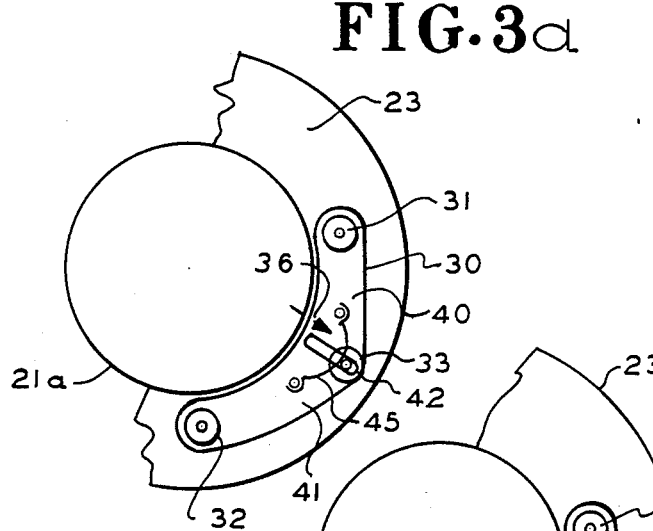
FIG. 3a
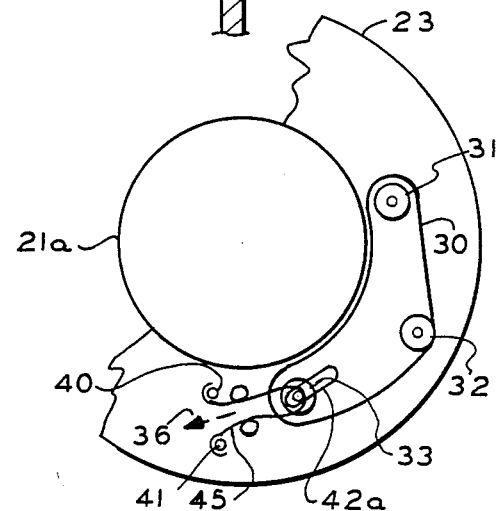
FIG. 3b
FIG. 3c

NON-ROTATING HUB IN STEERING WHEEL ASSEMBLY

BACKGROUND OF THE INVENTION

1. Field of the Invention

The present invention relates to steering wheel assemblies with particular emphasis placed on use in motor vehicles. More particularly the invention relates to the hub or pad of a steering wheel assembly used in motor vehicles and apparatus for maintaining the hub virtually stationary.

2. Prior Art

It is conventional practice to locate several switches controlling motor vehicle accessories, such as cruise control and/or audio systems in the pad or hub of the steering wheel of the vehicle. By locating switches which control the cruise control and/or audio system and/or the horn, for example, in the pad or hub of the steering wheel the switches, and therefore the control of such accessories are made convenient to the driver of the vehicle. In order to reduce any confusion that may be caused by moving these switches arcuately, as the steering wheel is rotated during the steering operation of the vehicle, the pad or hub carrying these switches was arrested so that the pad or hub would remain stationary, relation to the driver, when the steering wheel of the vehicle was rotated for the purpose of steering the vehicle.

The problem of arresting the steering wheel pad is addressed in U.S. Pat. #4,808,146. This prior art patent teaches the use of a pair of external gears connected to upper and lower floating members with the steering wheel interposed between the members. A timing belt carried on the rotatable steering wheel is driven by the lower member. The timing belt drives the gear of the upper member so that the upper member and/or steering wheel hub or pad remains stationary, relative to the driver, when the wheel is rotated.

In order to maintain the timing belt at proper tension, one of the rollers supporting the timing belt is made a tension roller by connecting a biasing coil spring to the roller and to a spoke on the steering wheel. The coil spring, which is connected to a timing belt roller and the steering wheel spoke need be rather strong for the size of coil spring used due to the lack of space available. A small, strong coil spring is often too stiff to provide the resilience in the spring that is required. The compromise coil spring usually used often breaks and or fails to perform disassembly of the steering wheel is needed in order to retrieve the broken parts of the spring and/or replace the spring.

SUMMARY OF THE INVENTION

The present invention provides a greatly improved non-rotating hub assembly in a steering wheel in which the hub or pad of the steering wheel remains stationary, or non-rotatable, relative to the operator of the motor vehicle when the steering wheel is rotated during the steering operation.

The improved non-rotating hub in the steering wheel assembly included an upper or the hub or pad member, floating with respect to the steering wheel and a lower arrested member, sandwiching a central portion of the steering wheel. Both the pad member and the lower arrested member include external gears, each of which are rotatably fitted to an endless belt carried on the steering wheel. The endless belt orbits both external gears as the steering wheel is rotated.

The endless belt is held in position by a pair of rollers mounted between two mounting collars secured to the steering wheel. A tension roller, a third roller, is provided which is effectively mounted between the two mounting rings or collars, in which mounting pins extend through an elongated or slotted hole in the mounting collar. A pair of studs, mounted on the mounting collar support the ends of linear or flat spring which impinges against the studs on the mounting collar and the roller pin extending through the elongated hole and converts the third, or idle roller into a tension roller, applying tension on the endless belt.

Upper and lower tension springs are suggested in order to adequately exert a biasing pressure on the tension roller, which keeps the endless belt at a desired tension against the external gears of the upper and lower stationary appearing floating members of the steering assembly.

It should be pointed out that internal vehicle safety equipment, such as air bags are preferably located in the pad or hub of the steering wheel, for driver safety.

Preferably, the air bag is positioned in the pad so that the bag is deployed in a predetermined direction, relative to the position of the pad. It is therefore preferred that the pad or hub remain stationary relative to the operator of the vehicle when the steering wheel is rotated so that if the air bag should deploy the direction of extension of the air bag may be in the predetermined direction.

It will also be appreciated that because of the size of an air bag module the hub of a steering wheel, into which an air bag module is mounted may obstruct at least part of the view of the instrument cluster on the instrument panel when the steering wheel and hub are rotated as a unit. This problem is eliminated when the hub of the steering wheel is arrested from rotational travel relative to the driver, thereby insuring a non-restricted view of the instrumentation, providing for much greater safety.

BRIEF DESCRIPTION OF THE DRAWINGS

FIG. 2 is a representation in cross section, of a steering wheel assembly using the present invention;

FIGS. 3a, 3b and 3c represent some alternate structures that may be used.

DESCRIPTION OF A PREFERRED EMBODIMENT

Figure 1:
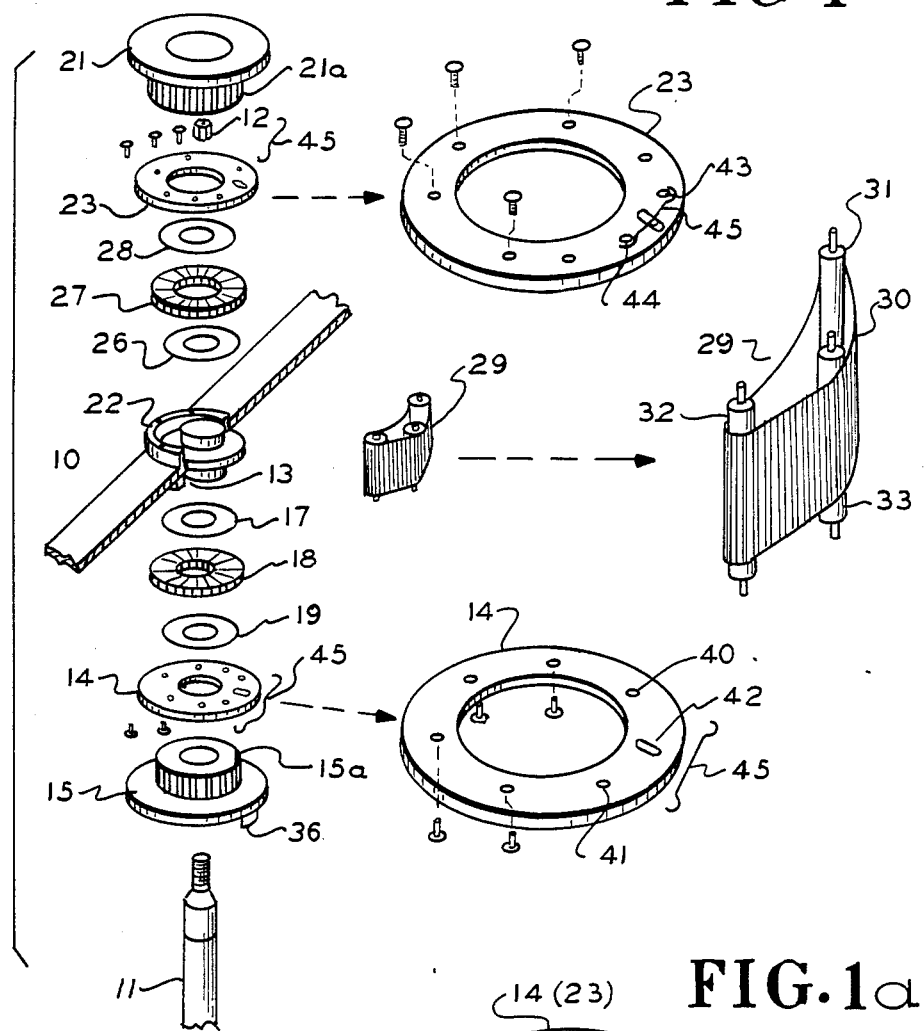
FIG. 1 is an exploded view of the non-rotating hub in a steering wheel assembly, with some parts of the assembly repeated in enlarged form.

The exploded view of the parts of a represented steering assembly include a steering wheel, represented in part by 10 which shows a portion of the spokes of the steering wheel and a center or mount that is secured to a steering shaft 11 by fitting over the shaft and securing the wheel to the shaft by a nut 12.

A lower floating element 15 includes an external gear 15a. This element compares with the upper floating element 21 and external gear 21a. The floating element 15 rides on a washer/bearing/washer combination 17, 18 and 19, which permits the element 15 to ride smoothly and freely in the mounting of the steering wheel.

The floating element 21, with the external gear 21a rides on the washer/bearing/washer combination 26, 27, and 28.

The steering wheel includes a boss or raised mounting 13 (lower) and 22 (upper) on which the mounting collars 14 and 23 are mounted with mounting screws.

Preferably the raised mounting's 13 and 22 around the center boss are essentially in mirror image or symmetrical so that the mounting collars 14 and 23 may be substantially identical or duplicates.

As seen in FIG. 2 the floating member 15 rides on the washer/bearing/washer combination so that the floating member is spaced from the mounting collar 14 when the collar 14 is mounted on the outer boss 13.

The floating member 15 is held in an arrested position by the cover or steering column 20 by the protrusions 36 and 37 on the floating member.

Figure 1A:
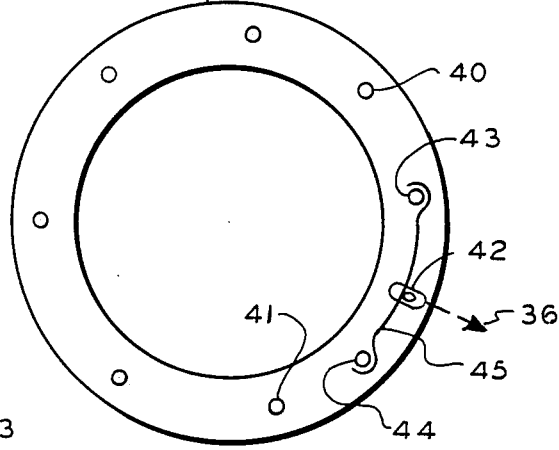
FIGS. 1a and 1b are enlarged representations of a mounting collar both in plane view and side elevation view.
Figure 1B:
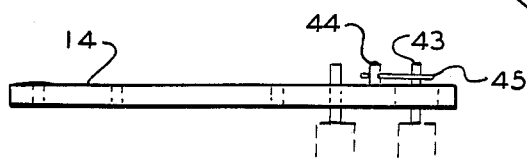

Each mounting ring or mounting collar 14 (and 23) include roller pin retaining holes 40 and 41 and elongated hole 42, shown in FIG. 1a. On one face of each mounting collar are two linear spring retaining studs 43 and 44.

The endless belt assembly 29 is held in position by the pins of the belt rollers 31, 32 and 33 extending into the retaining holes 40, 41 and 42 of each mounting ring. The endless belt is preferably a toothed belt having a width which fits around the end pins 31 and 32 and is held against the external gear teeth 15a (21a) by the tension roller 33 exerting a pressure on the endless belt.

Although the endless belt is represented as one belt having a width that approximates the length of the rollers, the belt 30 may be two or more separate belts. If only one belt is used breakage of the one belt causes failure of the assembly. If a plurality of belts are used breakage of one belt may not necessarily result in failure of the assembly.

The idler or tension roller 33 includes pins on both ends which pass through the elongated hole 42. Studs 43 and 44 positioned on each side respectively of the elongated hole 42 retain the ends of the linear spring 45 while the mid section of the spring contacts the pin on the roller 33 in a three point biasing position.

It is apparent that the mounting bosses 13 and 22 are cut away to provide space (not shown) in which to mount the endless belt assembly 29. This is indicated seen in FIG. 2.

The spring 45 is referred to as a linear or flat spring to distinguish this spring from a spiral spring. However, it is apparent that the spring 45 may have some bows, loops or curves but essentially lies in substantially the same plane along its length.

When in a three point position, a pressure may be applied to the pin of the tension roller extending from the elongated hole 42, the spring 45 ends being retained by the studs 43 and 44. The spring 45 will force the pin of tension roller 33, and therefore will bias roller 33 in the direction of arrow 36, in the elongated hole or slot 42 thus keeping the belt 30 in contact with the gears 15a and 21a.

With the components thus positioned, the lower floating element 15 is arrested by the steering case or steering column 20 and, as the steering wheel is rotated, the endless belt orbits the faces of the external gears 15a and 21a.

The gear teeth or gear face of the external gear 15a drives the belt 30 as the belt assembly 29 orbits the gear held in a stationary or arrested position by the steering column. As the belt is driven around the rollers 31 and 32 gear the of the upper floating element 21 is driven with respect to the rotating steering wheel so that element 21 is held in a virtually stationary state, relative to the driver of the vehicle. Accordingly the pad 50, mounted on the floating member 21 is maintained in a virtually stationary state so that switches mounted on the pad or an air bag safety component positioned inside the pad will be in a stationary state, relative to the driver of the vehicle.

FIGS. 3a, 3b and 3c represent alternate arrangements for providing a biasing force on the belt which is driven by and drives the upper and lower external gears.

Some alternate arrangement may provide a radially disposed slotted hole 42 as seen in FIGS. 1, 1a and 3a while the spring used may be a linear or flat spring or a flat spring with a loop to pass over the retaining pin on the movable tension roller.

FIG. 3b represents an alternate structure where the fixed rollers are the end roller 31, the center roller 32 and the movable tension roller 33 is an end roller. In this structure the slotted hole may be arcuately positioned and some what curved as in 42a. The studs 40 and 41 would be located on the sides of the slotted remote hole from the fixed roller retaining holes or may be located between the slotted hole and the fixed roller retaining holes as in FIG. 3c.

Although a preferred embodiment of the invention has been represented and described and several alternate structures have been shown and described other changes and modification may be made in the invention, as will become apparent to those skilled in the art, without departing from the spirit of the invention.

What is claimed is:

1. An improved assembly for retaining a hub in a rotatable steering wheel of a motor vehicle stationary relative to a driver of the motor vehicle, said assembly comprising:
   (a) a steering wheel coupled to a steering shaft of said motor vehicle, said steering wheel having a first axis;
   (b) a first external gear rotatably mounted on an upper portion of said steering wheel and having a hub coupled thereto;
   (c) a second external gear rotatably mounted on a lower portion of said steering wheel, said second external gear coupled to a steering column for arresting said second external gear from rotational travel;
   (d) endless belt means meshing with said first external gear and said second external gear, said endless belt means orbiting said first axis when said steering wheel rotates;
   (e) a first mounting means and a second mounting means each mounted on said steering wheel, each mounting means including first and second spaced mounting holes each for receiving a mounting pin of a belt roller for supporting first and second belt rollers for supporting said endless belt means and said first mounting means includes a slotted hole for receiving a mounting pin for a belt tension means and a first stud and a second stud each mounted on opposite sides respectively of said slotted hole and
   (f) linear spring means having first and second ends and a mid-point between said ends, said first end urged against said first stud and said second end urged against said second stud and said mid-point urged against said mounting pin for said belt tension means for biasing said endless belt means.

2. An improved assembly as in claim 1 and in which said first external gear is rotatably mounted on said first axis.

3. An improved assembly as in claim 2 and in which said second external gear is rotatably mounted on said first axis.

4. An improved assembly as in claim 1 and in which said first mounting means is a mounting collar.

5. An improved assembly as in claim 4 and in which said second mounting means is a mounting collar.

6. An improved assembly as in claim 4 and in which said slotted hole in said first mounting collar is radially disposed.

7. An improved assembly as in claim 4 and in which said slotted hole in said first mounting collar is arcuately disposed.

8. An improved assembly as in claim 1 and in which said belt tension means is an idler roller.

9. An improved assembly as in claim 1 and in which said first stud is disposed between said first spaced mounting hole and said slotted hole.

10. An improved assembly as in claim 1 and in which said first stud is disposed between said first spaced mounting hole and said slotted hole land said second stud is disposed between said second spaced mounting hole and said slotted hole.

11. An improved assembly for retaining a hub in a rotatable steering wheel of a motor vehicle stationary, relative to a driver of the motor vehicle, said assembly comprising:
(a) a steering wheel coupled to a steering shaft of a motor vehicle, said steering wheel mounted on a first axis of rotation;
(b) a first external gear rotatably mounted on an upper portion of said steering wheel, said first external gear coupled to a hub in said steering wheel;
(c) a second external gear rotatably mounted on a lower portion of said steering wheel, said second external gear coupled to a stationary steering column for arresting said second external gear from rotational travel;
(d) an endless belt means mounted on said steering wheel for orbiting said first external gear and said second external gear when said steering wheel rotates;
(e) a first mounting means mounted on said steering wheel and spaced from said first external gear and a second mounting means mounted on said steering wheel and spaced from said second external gear, said first mounting means including first and second holes for retaining first pins of first and second rollers supporting said endless belt means said second mounting means including third and fourth holes for retaining second pins of said first and second rollers for retaining said first and second rollers in a fixed position; and
(f) tension means coupled to said first mounting means for applying tension to said endless belt means for maintaining said endless belt means and said first external gear and said second external gear in meshed condition wherein said tension means includes an idler roller mounted within said endless belt means retained in mounting holes in said first mounting means and said second mounting means and said first mounting means includes a first stud and a second stud and said tension means includes linear spring means urged against said first stud and said second stud and said idler roller for applying tension on said endless belt means.

12. An improved assembly as in claim 11 and in which said first external gear is rotatably mounted on said first axis.

13. An improved assembly as in claim 12 and in which said second external gear is rotatably mounted on said first axis.

* * * * *